United States Patent [19]
Gustin et al.

[11] Patent Number: 5,052,534
[45] Date of Patent: Oct. 1, 1991

[54] ELECTROMAGNETIC SYNCHRONIZING AND SHIFTING CLUTCH

[75] Inventors: David C. Gustin, Rockton, Ill.; Robert L. Stibbe, Janesville, Wis.; Paul A. Larson, Belvidere, Ill.

[73] Assignee: Dana Corporation, Toledo, Ohio

[21] Appl. No.: 605,517

[22] Filed: Oct. 30, 1990

[51] Int. Cl.[5] .............................. F16D 13/00
[52] U.S. Cl. ................... 192/53 D; 192/84 C
[58] Field of Search ............ 192/53 D, 84 C

[56] References Cited

U.S. PATENT DOCUMENTS

| | | | |
|---|---|---|---|
| 1,601,001 | 9/1926 | Sleeper | 192/53 D X |
| 3,227,253 | 11/1966 | Becker et al. | 192/84 C |
| 3,507,374 | 4/1970 | Allaben, Jr. | 192/84 C |
| 3,669,231 | 6/1972 | Schindel et al. | 192/53 D |
| 3,713,519 | 1/1973 | Ruget | 192/53 D |
| 4,144,826 | 3/1979 | Stehlin et al. | 192/53 D X |
| 4,561,520 | 12/1985 | Fogelberg | 192/84 C X |
| 4,566,575 | 1/1986 | Sekella | 192/84 C |
| 4,632,207 | 12/1988 | Moore | 180/247 |
| 4,648,492 | 3/1987 | Moore | 192/53 D X |
| 4,770,280 | 9/1988 | Frost | 192/53 |
| 4,828,091 | 5/1989 | Gustin | 192/84 C |

FOREIGN PATENT DOCUMENTS 697980 11/1964 Canada ..................... 192/84 C

*Primary Examiner*—Allan D. Herrmann
*Assistant Examiner*—Nicholas Whitelaw
*Attorney, Agent, or Firm*—Leydig, Voit & Mayer

[57] ABSTRACT

An electromagnetic clutch includes a fixed field shell with a multiple turn coil, a rotor rotatable with and slidable along a splined input shaft, and a rotatable armature disposed in axially opposing relation with the rotor. An internally splined locking ring is coupled to rotate with the armature and is supported to rotate with and slide along a splined output shaft. When the coil is first energized, the armature is drawn into engagement with the rotor by magnetic flux and acts through the locking ring to cause the output shaft to rotate at substantially the same speed as the input shaft. Thereafter, the magnetic flux causes the rotor and the armature to move axially as a unit toward the field shell so as to shift the locking ring into meshing engagement with the input shaft and thereby couple the output shaft for rotation with the input shaft via the splined coupling.

13 Claims, 4 Drawing Sheets

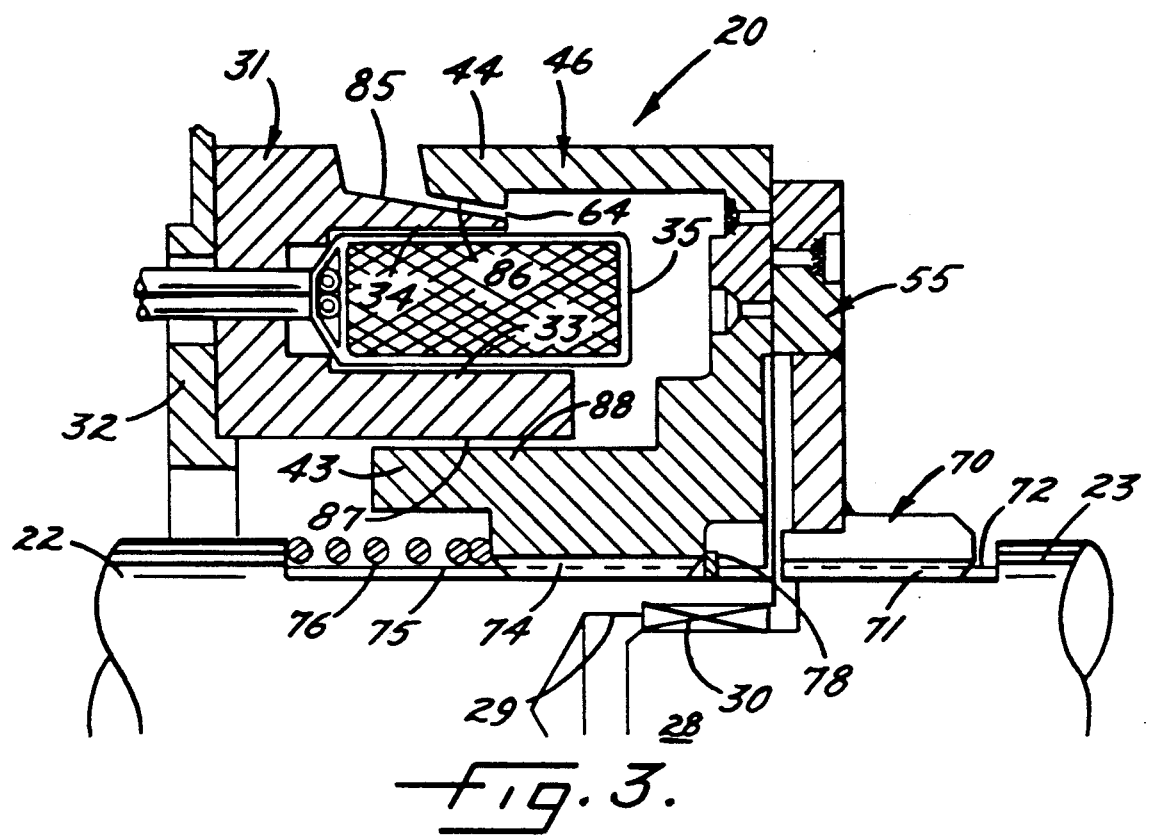
_Fig. 3._
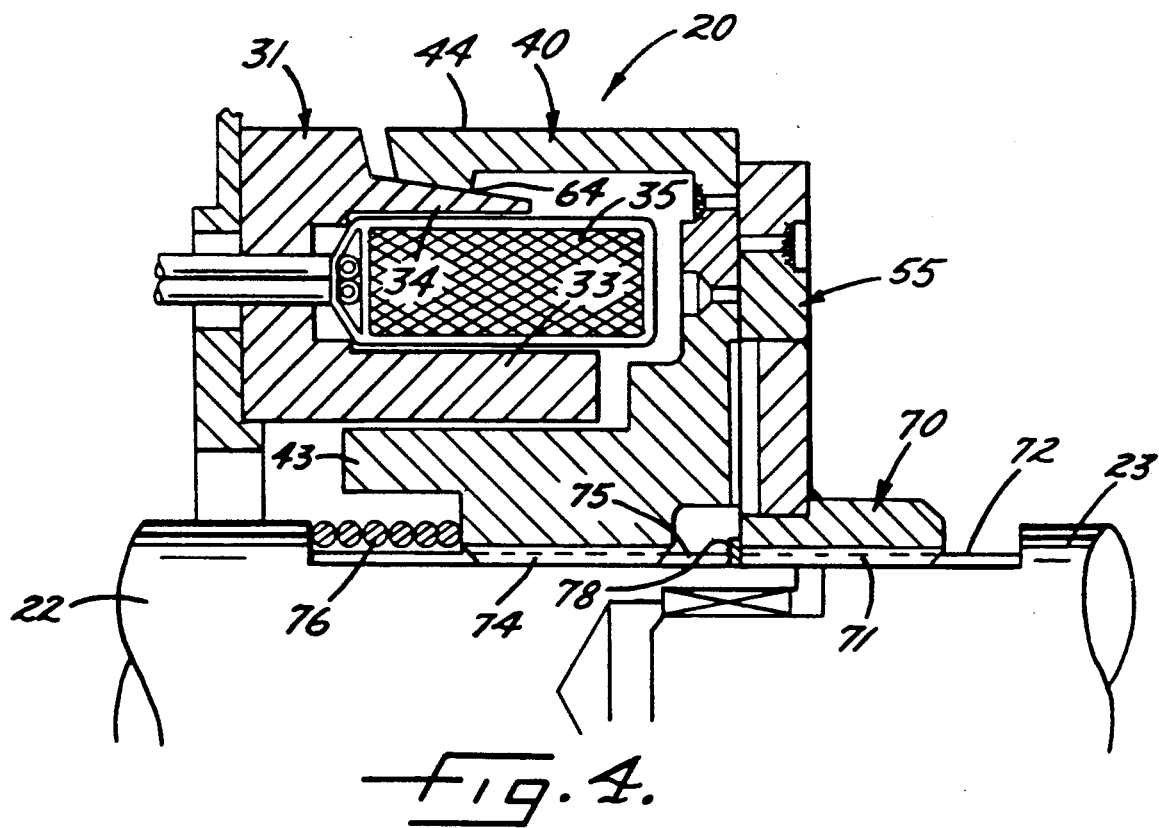
_Fig. 4._

ELECTROMAGNETIC SYNCHRONIZING AND SHIFTING CLUTCH

BACKGROUND OF THE INVENTION

This invention relates generally to an electromagnetic clutch for selectively causing torque to be transmitted between an input shaft and an output shaft.

In general, an electromagnetic clutch of the type under consideration comprises a rotor rotatable with one shaft, an armature rotatable with the other shaft, and a field assembly having a selectively energizable coil for causing magnetic flux to thread through a field shell. When the coil is energized, the flux cuts across air gaps between the field shell and the rotor and across an air gap between the rotor and the armature in order to attract the armature axially into frictional engagement with the rotor and thereby couple the two shafts for rotation in unison.

Although the clutch of the invention may be used in different applications, it is especially useful as a synchronizing clutch for causing two shafts to rotate at substantially the same speed prior to shifting gears, splines or other toothed members on the shafts into meshing engagement in order to establish a positive drive between the shafts. Fogelberg U.S. Pat. No. 4,561,520 discloses an electromagnetic synchronizing clutch in conjunction with the transfer case of a 4-wheel drive vehicle. While the Fogelberg clutch causes the two shafts to rotate at substantially the same speed prior to shifting of the toothed members into meshing engagement, the shifting itself is initiated through the use of a conventional mechanical linkage.

SUMMARY OF THE INVENTION

The primary aim of the present invention is to provide a new and improved electromagnetic clutch which not only is capable of causing an output shaft to rotate at substantially the same speed as an input shaft but which also serves to physically shift toothed members on the two shafts into meshing engagement.

A more detailed object of the invention is to achieve the foregoing through the provision of an electromagnetic clutch in which magnetic force first shifts the armature axially into engagement with the rotor to bring the output shaft up to about the speed of the input shaft and then shifts the rotor and the armature axially as a unit to shift toothed members into meshing engagement.

A further object is to effect smooth and virtually instantaneous engagement of the toothed members by allowing one of the toothed members to rotate through a limited range relative to the other toothed member after the two shafts have attained synchronous speed and as the toothed members are shifted into meshing engagement.

An important object of the invention is to construct the rotor and the field shell in a manner causing the magnetic flux to first shift the armature axially into engagement with the rotor, to then shift the rotor and the armature axially as a unit and, with the application of relatively low power to the coil, to hold the rotor and the armature in their axially shifted positions.

The invention also resides in the use of a single coil for producing flux for effecting axial shifting the armature relative to the rotor and for effecting axial shifting of the rotor and the armature as a unit.

These and other objects and advantages of the invention will become more apparent from the following detailed description when taken in conjunction with the accompanying drawings.

BRIEF DESCRIPTION OF THE DRAWINGS

FIG. 3 is a view similar to FIG. 2 but shows the armature of the clutch engaged with the rotor in order to rotate the output shaft at approximately the same speed as the input shaft.

FIG. 4 is also a view similar to FIG. 2 but shows the armature and the rotor both shifted axially in order to shift the toothed member of the clutch into meshing engagement with the toothed member of the input shaft.

DETAILED DESCRIPTION OF THE PREFERRED EMBODIMENTS

Figure 1:
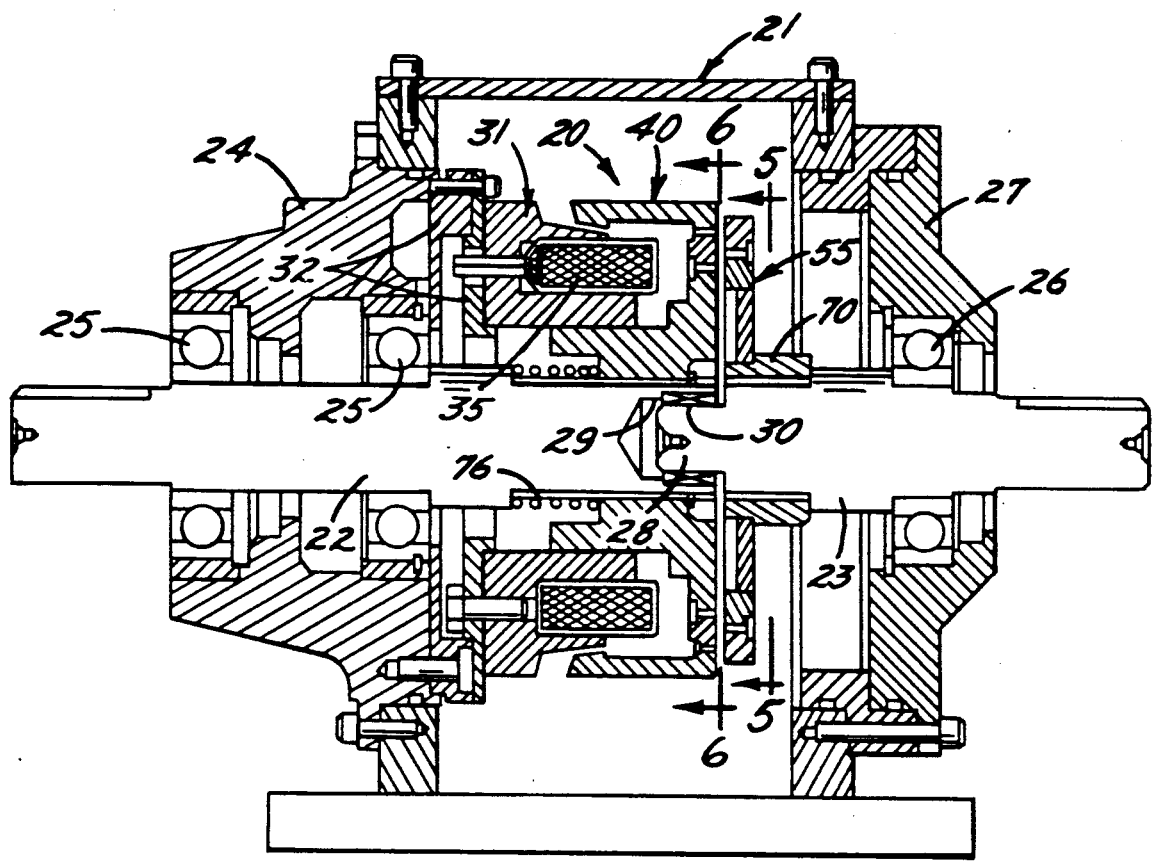
FIG. 1 is a cross-sectional view taken axially through a transmission equipped with one embodiment of a new and improved electromagnetic clutch incorporating the unique features of the present invention.

For purposes of illustration, the electromagnetic clutch 20 of the present invention has been shown in the drawings in connection with the transfer case 21 of a 4-wheel drive vehicle and is used to cause torque to be transmitted selectively between the input shaft 22 and the output shaft 23 of the transfer case. The transfer case itself has been shown in simplified test model form and includes an end member 24 having a pair of bearings 25 which rotatably support the input shaft 22. A bearing 26 in an opposite end member 27 rotatably supports the output shaft 23. The latter is formed with a reduced diameter end portion 28 which is piloted into a bore 29 in the adjacent end of the input shaft and which is rotatably supported in the bore by a bearing 30. It should be appreciated that the output shaft could be formed by a sprocket rotatably supported on an extension of the input shaft and connected by a chain to a parallel shaft which forms the ultimate output shaft.

Figure 2:
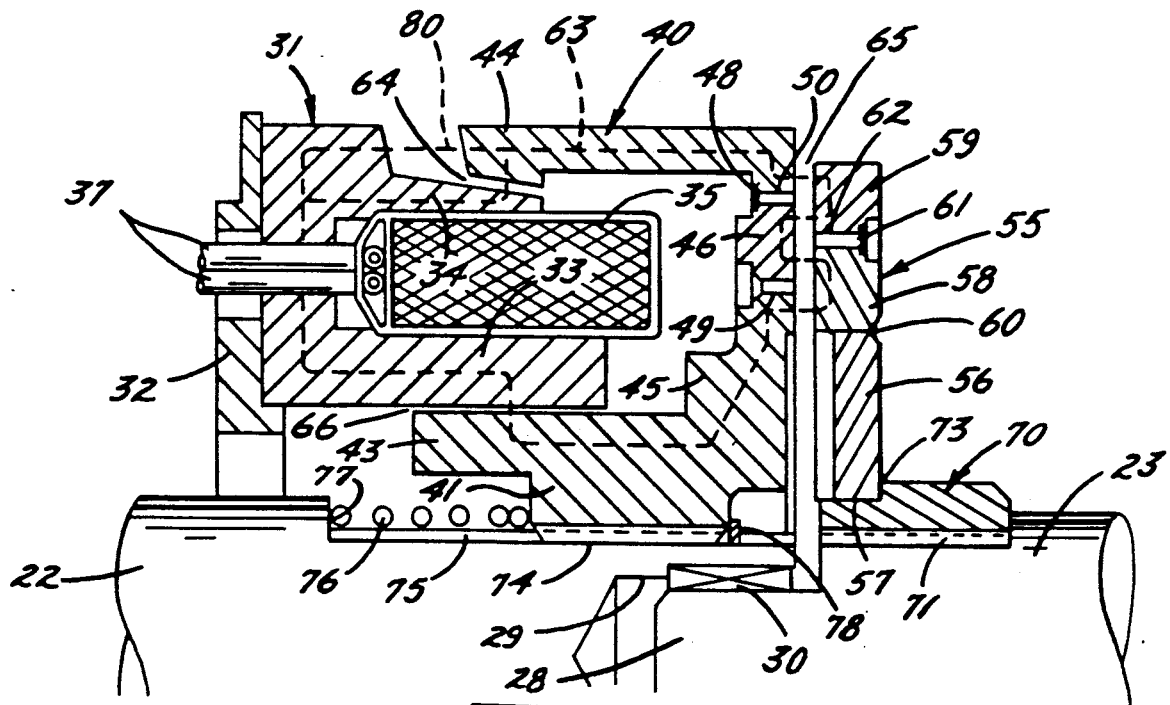
FIG. 2 is an enlarged view of certain components illustrated in FIG. 1 and shows the clutch fully disengaged to permit the input shaft of the transmission to rotate independently of the output shaft.

The clutch 20 includes a field assembly having a field shell 31 which is fixed to the end member 24 by a pair of mounting plates 32. The field shell is made of steel or other material having low magnetic reluctance and is formed with inner and outer radially spaced pole rings 33 and 34 (FIG. 2). An annular coil 35 formed by a multiple turn winding is nested between the pole rings and is adapted to be connected to a source of d.c. voltage by lead wires 37. When the coil is energized, magnetic flux is produced in the field shell and threads a path which will be described subsequently.

Figure 6:
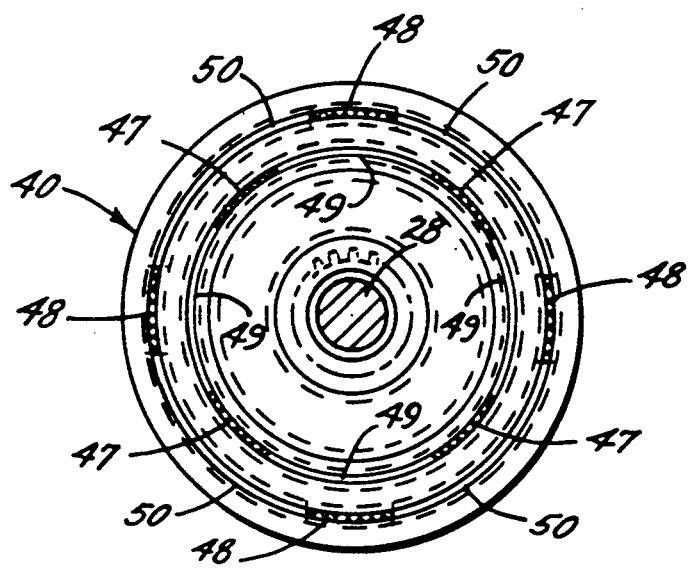
FIG. 6 is a cross-section taken substantially along the line 6—6 of FIG. 1.

Rotatable with the input shaft 22 is a rotor 40 which is formed with a mounting hub 41, an inner pole ring 43 and a radially spaced outer pole ring 44. One end portion of the inner pole ring 43 is located inwardly of and in closely spaced relation with the inner surface of the inner pole ring 33 of the field shell 31 while one end portion of the outer pole ring 44 is spaced from and extends around the outer surface of the outer pole ring 34 of the shell. At their opposite ends, the pole rings 43 and 44 are spanned by an end plate which forms part of the rotor. The end plate is formed in part by a flange 45 projecting radially outwardly from the inner pole ring 43 and is formed in part by an annulus 46 located between and spaced radially from the flange and the outer pole ring 44. Angularly spaced welds 47 and 48 (FIG. 6) of nonmagnetic material at the inner and outer peripheries, respectively, of the annulus 46 secure the latter to the flange 45 and the outer pole ring 44. As a result, the end face of the rotor is formed with two radially spaced rows of angularly spaced slots 49 and 50 which extend through the end face.

Figure 5:
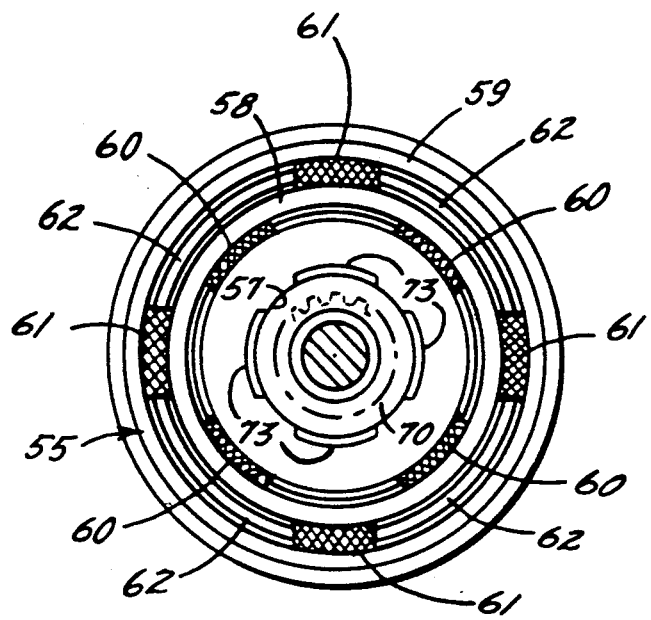
FIG. 5 is a cross-section taken substantially along the line 5—5 of FIG. 1.

Disposed in axially opposted relation with the end face of the rotor 40 is an armature 55 which is made of steel and which rotates with the output shaft 23. In this instance, the armature is formed by three components, namely, an inner disc 56 (FIGS. 2 and 5) having a central opening 57, an intermediate ring 58 and an outer ring 59. The inner periphery of the intermediate ring 58 abuts the outer periphery of the disc 56 and is secured thereto by angularly spaced welds 60. The outer periphery of the intermediate ring 58 is spaced inwardly from the inner periphery of the outer ring 59 and is fastened thereto by a series of angularly spaced welds 61 of nonmagnetic material. Thus, a row of angularly spaced through-slots 62 exists in the armature between the rings 58 and 59. The row of slots 62 of the armature is substantially centered in a radial direction between the two rows of slots 49 and 50 of the rotor 40.

When the coil 35 is de-energized, the armature 55 is spaced axially a short distance (e.g., 0.040") from the end plate of the rotor 40 as shown in FIG. 2. Upon energization of the coil, magnetic flux threads a path 63 indicated by dashed lines in FIG. 2 and attracts the armature axially into engagement with the rotor. Specifically, flux cuts radially across an annular air gap 64 between the outer pole ring 34 of the field shell 31 and the outer pole ring 44 of the rotor 40, threads axially back and forth in a zig-zag path across an axial air gap 65 between the rotor and the armature, and then cuts radially across an annular air gap 66 between the inner pole ring 43 of the rotor and the inner pole ring 33 of the field shell. By virtue of the magnetic attraction and friction, the armature 55 is rotated by the rotor 40 so as to cause the output shaft 23 to be rotated by the input shaft 22.

The electromagnetic clutch 20 as described thus far is conventional for the most part. While the clutch is capable of transmitting torque between the shafts 22 and 23, it is not capable of transmitting high torque over sustained periods of time as is necessary in a transfer case for a vehicle. To enable the transfer case 21 to carry high torque, the two shafts are positively tied together by a geared coupling when torque is to be transmitted to the output shaft.

In accordance with the present invention, the clutch 20 first brings the output shaft 23 up to approximately the same speed as the input shaft 22 to enable a geared coupling to be established between the two shafts and then performs a shifting function to establish the geared coupling without need of employing mechanical linkages, shifting forks or the like. Thus, the clutch 20 not only serves as a synchronizing clutch to permit shifting of a geared coupling but also effects the actual shifting itself so as to significantly simplify the construction of the transfer case 21 and to enable the shifting to be performed by operation of an electrical control rather than by manual force.

Figure 7:
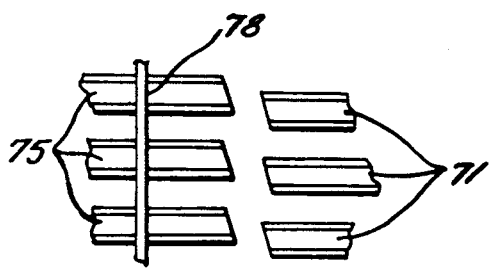
FIG. 7 is a schematic view showing the toothed members of the input shaft and the clutch prior to being shifted into meshing engagement.

More specifically, the armature 55 carries a toothed member 70 which couples the armature to rotate with and to slide axially relative to the output shaft 23. In this particular instance, the toothed member 70 is a locking ring whose inner periphery is formed with a series of axially extending and angularly spaced spline teeth 71 (FIGS. 3 and 7). The locking ring 70 encircles the end portion of the output shaft 23 and its spline teeth 71 mesh with similar spline teeth 72 formed on the end portion of the output shaft. Angularly spaced welds 73 (FIGS. 2 and 5) between the outer periphery of the locking ring and the outboard face of the armature disc 56 fix the ring securely to the armature 55.

In carrying out the invention, the inner periphery of the hub 41 of the rotor 40 is formed with angularly spaced and axially extending spline teeth 74 (FIG. 2) which mesh with similar teeth 75 (FIGS. 2 and 7) on the outer periphery of the end portion of the input shaft 22, the splines 75 extending to the extreme end of the shaft. Thus, the rotor 40 is not only coupled to rotate with the input shaft 22 but also is supported to slide axially along the shaft.

Further in keeping with the invention, the rotor 40 is biased to slide along the input shaft 22 toward the armature 55. For this purpose, a coil spring 76 (FIG. 2) is telescoped over the input shaft and is compressed between one end of the rotor hub 41 and a shoulder 77 on the input shaft. Thus, the spring 76 urges the rotor 40 from left-to-right along the input shaft 22 and tends to force the rotor toward the armature 55. Axial movement of the rotor toward the armature is limited by a stop 78 which herein is in the form of a snap ring contracted around the splined end portion of the input shaft 22.

When the coil 35 is de-energized, the spring 76 pushes the rotor hub 41 against the snap ring 78 as shown in FIG. 2 and, as stated above, the armature 55 is spaced axially from the rotor when the coil is deenergized. When the rotor and armature are so positioned, the end of the locking ring 70 is spaced about 0.060" from the end of the input shaft 22 and thus the spline teeth 71 of the ring are located out of meshing engagement with the spline teeth 75 of the input shaft as shown in FIGS. 2 and 7. Accordingly, the input shaft 22 is free to rotate without turning the output shaft 23.

To initiate a shifting operation, the coil 35 is first energized with current of relatively low magnitude. As an incident thereto, magnetic flux threading the path 63 attracts the armature 55 axially into engagement with the rotor 40 as permitted by the sliding fit between the spline teeth 71 and the spline teeth 72 (see FIG. 3). As a result, the armature turns with the rotor and causes the output shaft 23 to rotate at substantially the same speed as the input shaft 22. Some slight slippage occurs between the rotor and armature and thus the speed of the output shaft does not precisely match the speed of the input shaft.

Figure 8:
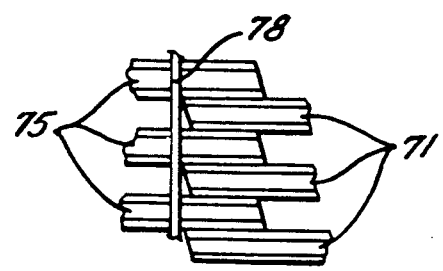
FIG. 8 is a schematic view similar to FIG. 7 but shows the toothed members shifted into meshing engagement.
Figure 9:
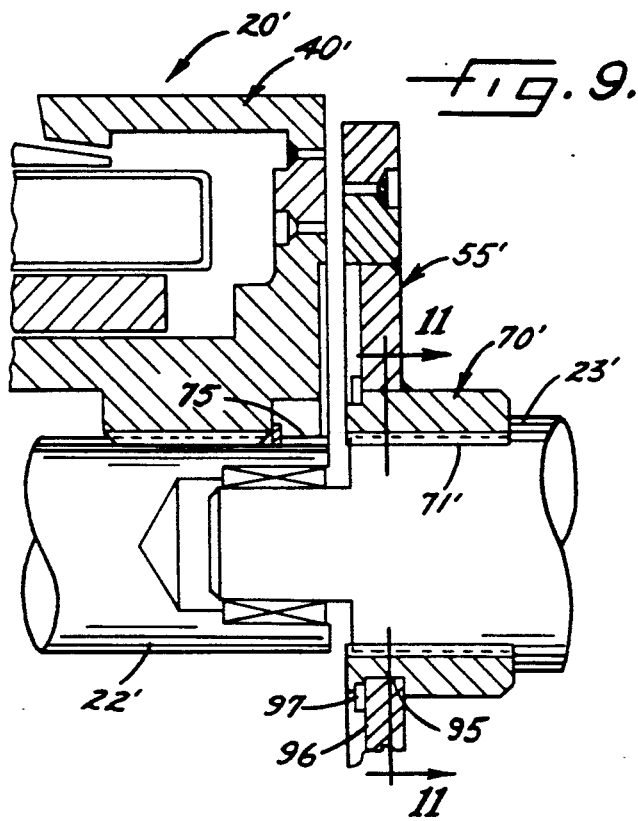
FIG. 9 is a view similar to FIG. 2 but shows another embodiment of a clutch incorporating the features of the invention.

When the armature 55 engages the rotor 40, the spline teeth 71 of the locking ring 70 stop short of the spline teeth 75 of the input shaft 22 as shown in FIG. 3. After the armature 55 attains approximately the same speed as the rotor 40, the coil 35 is energized with current of a higher magnitude. When the coil is so energized, flux continues to thread the path 63 but also threads a second path 80 (FIG. 2). Flux threading along the path 80 attracts the rotor 40 axially toward the field shell 31 and causes the rotor to slide axially along the input shaft 22 in opposition to the spring 76 and as permitted by the spline teeth 74 and 75. The armature 55 moves axially as a unit with the rotor and pulls the ends of the spline teeth 71 of the locking ring 70 toward the spline teeth 75 of the input shaft 22 (see FIG. 4). If the teeth 71 and 75 of the two sets happen to be in complementary angular alignment at the instant the teeth 71 reach the teeth 75, the teeth 71 immediately slide into meshing engagement with the teeth 75 and slide to the fully engaged position shown in FIG. 8, the teeth 71 being stopped in such position by the snap ring 78. If—as is more often the case—the teeth 71 are out of complementary alignment with the teeth 75 as shown in FIG. 7 when the teeth 71 first reach the teeth 75, the ends of the teeth 71 will momentarily stop against the ends of the teeth 75 until the speed mismatch between the rotor 40 and the armature 55 brings the sets of teeth into alignment to allow the teeth 71 to slide to the position of FIG. 8 in full meshing engagement with the teeth 75.

The coil 35 is kept energized and the components remain positioned as shown in FIG. 4 until it is desired to interrupt the drive to the output shaft 23. Such interruption is effected by de-energizing the coil and, as an incident thereto, the spring 76 returns the rotor 40 to the right and against the snap ring 78 to shift the teeth 71 of the locking ring 70 out of engagement with the teeth 75 of the input shaft 22. The absence of flux along the path 63 releases the armature from the rotor so as to enable the rotor and the input shaft to rotate independently of the armature and the output shaft.

Advantageously, the pole rings 34 and 44 are configured so as to enable the magnitude of the current supplied to the coil 35 to be reduced once the rotor 40 has been moved to the shifted position of FIG. 4. For this purpose, the outer pole face 85 (FIG. 3) of the outer pole ring 34 of the field shell 31 is inclined at an acute angle relative to the longitudinal axis of the clutch 20. The inner pole face 86 of the outer pole ring 44 of the rotor 40 is inclined in the same direction and at the same angle. The inner pole face 87 (FIG. 3) of the inner pole ring 33 of the shell 31 and the inner pole face 88 of the inner pole ring 43 of the rotor 40 preferably are cylindrical and are concentric about the axis of the clutch. Accordingly, each pole face 85, 86 is inclined by virtue of forming such pole face as a frustoconical surface, the pole face 85 tapering upon progressing toward the free end of the pole ring 34 while the pole face 86 tapers upon progressing away from the free end of the pole ring 44.

With the pole faces 85 and 86 inclined as described, the air gap 64 between the pole faces becomes progressively narrower as the rotor 40 is shifted from the position shown in FIG. 3 to the position shown in FIG. 4.

As a result of narrowing of the air gap, the current required to maintain the armature 55 in engagement with the rotor is reduced. Thus, the magnitude of current supplied to the coil 35 may be reduced once the rotor has been shifted to the position shown in FIG. 4. Because the air gap 64 is relatively wide before the rotor is shifted, the rotor may be shifted through a comparatively long stroke.

From the foregoing, it will be apparent that the present invention brings to the art a new and improved electromagnetic clutch 20 which not only substantially synchronizes the speed of the output shaft 23 with the speed of the input shaft 22 but also effects the shifting. As a result, the entire shifting operation may be accomplished by actuating an electrical control and without need of shifting a mechanical linkage. The configuration of the pole faces 85 and 86 enable the clutch to be maintained in the shifted condition with relatively low current supplied to a single coil 35. While the clutch has been disclosed specifically in conjunction with a single coil which is supplied with modulating current, it should be appreciated that one coil could be used for pulling the armature 55 into engagement with the rotor 40 and a second coil used for shifting the rotor and armature axially as a unit. By properly configuring pole faces on the outer pole rings 34 and 44, the second coil may be de-energized and the rotor may be held in its shifted position by flux produced by the first coil once the rotor has been moved to its shifted position.

When the clutch 20 brings the output shaft 23 to approximately the same speed as the input shaft 22, the spline teeth 71 may, as mentioned above, be angularly misaligned with the spline teeth 75. Thus, the speed mismatch between the two shafts is relied upon to establish angular alignment of the teeth so as to enable the teeth to be shifted into meshing engagement. In some applications, it is necessary to be able to shift the teeth into meshing engagement under conditions of zero speed mismatch (i.e., where the output shaft rotates at precisely the same speed as the input shaft). The clutch 20' disclosed in FIGS. 9 to 14 fulfills this purpose. Components of the clutch 20' which correspond to the components of the clutch 20 of the first embodiment are indicated by the same but primed reference numerals.

Figure 10:
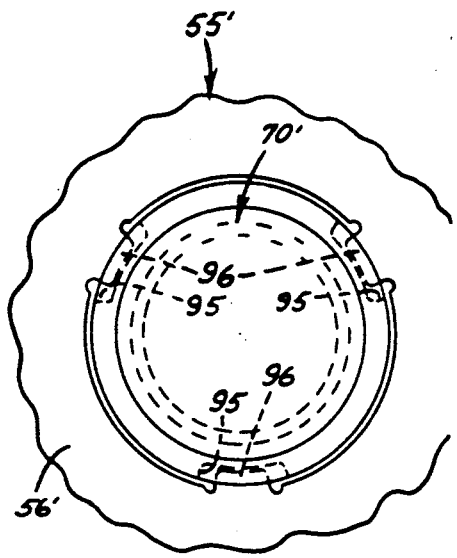
FIG. 10 is an end view of the clutch shown in FIG. 9.
Figure 11:
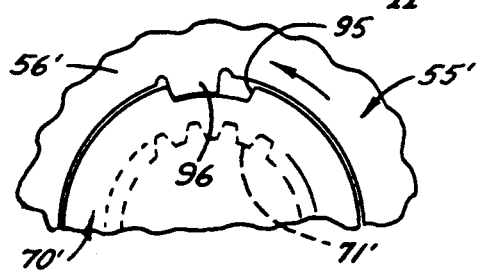
FIG. 11 is a cross-section taken substantially along the line 11—11 of FIG. 9.

In the clutch 20' shown in FIGS. 9 to 14, provision is made of a rotary lost motion connection between the armature 55' and the locking ring 70'. Specifically, the outer periphery of the locking ring 70' is formed with a series (herein, three) of angularly spaced and radially outwardly opening notches 95 (FIGS. 10 and 11). The inner periphery of the disc 56' of the armature 55' is formed with a corresponding number of angularly spaced lugs 96 which project radially inwardly into the notches 95. A snap ring 97 encircles the locking ring and holds the armature disc 56' against axially facing walls of the notches 95 in order to keep the armature in axially assembled relation with the locking ring.

As shown in FIG. 10, the angular width of each notch 95 is significantly greater than the angular width of the corresponding lug 96. As a result, the armature 55' is capable of rotating relative to the locking ring 70' through a limited distance before the lugs engage the sides of the notches and effect rotation of the ring.

Figure 13:
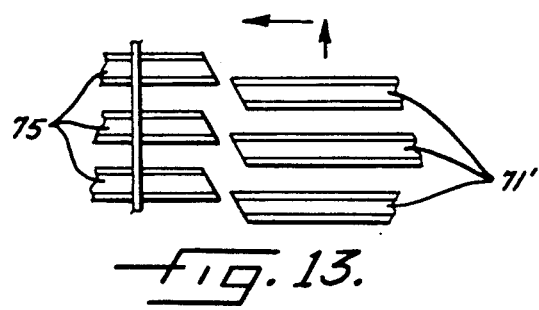
FIGS. 13 and 14 are views similar to FIGS. 7 and 8, respectively, but relate to the embodiment of the clutch shown in FIGS. 9 to 12.

FIG. 11 shows the position of the armature 55' relative to the locking ring 70' just after the armature has been brought into engagement with the rotor 40' and before the rotor is shifted axially. Assuming that the armature is being rotated in the direction of the arrow in FIG. 11, each lug 96 engages the leading end of the corresponding notch 95 and effects counterclockwise rotation of the locking ring 70'. At this point, the spline teeth 71' of the locking ring may be angularly misaligned with the spline teeth 75' of the input shaft 22' as shown in FIG. 13.

Figure 12:
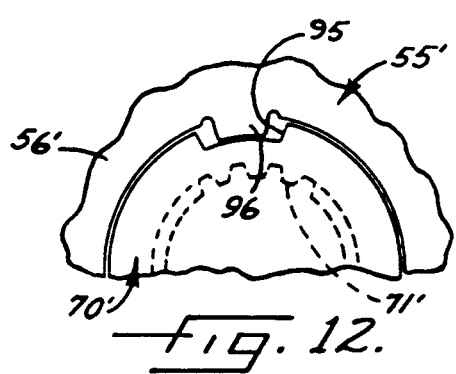
FIG. 12 is a view similar to FIG. 11 but shows one of the components in a moved position.
Figure 14:
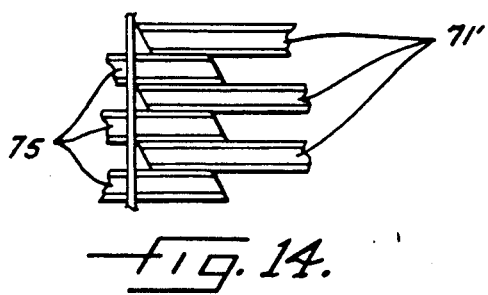

When the rotor 40' is shifted axially, beveled ends on the spline teeth 71' engage complementary beveled ends on the angularly misalinged spline teeth 75. This produces a camming action to cause the teeth 71' and the ring 70' to rotate further in a counterclockwise direction relative to the armature as shown in FIG. 12 and as permitted by the space between the trailing sides of the lugs 96 and the trailing sides of the notches 95. Thus, the backlash between the lugs and the notches allows the locking ring 70' and the output shaft 23' to rotate through a sufficient distance relative to the armature 55' to bring the teeth 71' into angular alignment with the teeth 75' and to enable the teeth 71' to slide into meshing engagement with the teeth 75' as shown in FIG. 14. Once such meshing engagement has been established, the backlash between the armature and the locking ring is of no detrimental significance since all of the torque is transmitted via the intermeshed teeth 71' and 75'.

A lost motion arrangement also may be effected by removing every other spline tooth 74 of the rotor 40 and every other spline tooth 75 of the input shaft 22 while keeping the number of spline teeth 71 of the locking ring 70 the same. This arrangement allows backlash between the rotor and the input shaft so as to permit the teeth 71 to shift into engagement with the spline teeth 75 under conditions of zero speed mismatch. Lost motion of the rotor, however, is not preferred because of the relatively high mass and inertia of the rotor as compared to that of the armature 55.

We claim:

1. The combination of first and second rotatable shafts, and an electromagnetic clutch for selectively causing torque to be transmitted between said shafts, said clutch comprising a first rotary member coupled to rotate with and move axially relative to said first shaft, a second rotary member coupled to rotate with and move axially relative to said second shaft and disposed in axially opposing relation with said first rotary member, means biasing said first rotary member axially toward said second rotary member, means for preventing said biasing means from shifting said first rotary member beyond a predetermined axial position, and selectively energizable coil means for producing magnetic flux for attracting said second rotary member axially into torque-transmitting engagement with said first rotary member and for thereafter causing said first and second rotary members to move axially as a unit in opposition to said biasing means.

2. The combination defined in claim 1 in which said biasing means comprise a spring acting axially against said first rotary member, said preventing means comprising a stop on said first shaft and acting axially against said first rotary member in opposition to said spring.

3. The combination defined in claim 1 in which said first rotary member includes radially spaced inner and outer annular pole faces, a rotationally and axially fixed field shell having radially spaced inner and outer annular pole faces located between and disposed in radially spaced relation with the inner and outer pole faces, respectively, of said first rotary member, said coil being located between the pole faces of said field shell, at least one of the pole faces of said first rotary member and the corresponding pole face of said field shell being axially inclined in a direction to cause the radial spacing between such pole faces to progressively decrease as said first rotary member moves axially relative to said shaft in opposition to said biasing means.

4. The combination defined in claim 3 in which said one pole face of said first rotary member and the corresponding pole face of said field shell are concentric and are substantially frustoconical.

5. The combination defined in claim 4 in which said one pole face of said first rotary member is the outer annular pole face of such member, the corresponding pole face of said field shell being the outer annular pole face of the field shell.

6. The combination defined in claim 5 in which the inner pole face of said first rotary member and the inner pole face of said field shell are substantially cylindrical.

7. The combination defined in claim 1 in which said first and second shafts are formed with first and second splined end portions, respectively, disposed in axially spaced end-to-end relation, said first and second rotary members having internally splined portions coupled to and slidable on said first and second splined end portions, respectively, the internally splined portion of said second rotary member sliding on said second splined end portion and staying free of said first splined end portion when said second rotary member is attracted axially into engagement with said first rotary member, and the internally splined portion of said second rotary member sliding partially onto said first splined end portion while remaining partially on said second splined end portion when said first and second rotary members move axially as a unit in opposition to said biasing means.

8. The combination defined in claim 7 in which said second rotary member comprises a disc and in which the internally splined portion of said second rotary member comprises a locking ring formed separately of said disc, and a lost motion connection between said locking ring and said disc and permitting said ring to rotate through a limited range relative to said disc.

9. The combination defined in claim 8 in which said lost motion connection comprises a set of angularly spaced notches formed in one of said disc and said ring and further comprises a set of angularly spaced lugs formed in the other of said disc and said ring and projecting into said notches, the angular width of said notches being substantially greater than the angular width of said lugs.

10. The combination defined in claim 9 in which said notches are formed in the outer periphery of said ring, said disc being annular with said lugs projecting inwardly from the inner periphery of said disc.

11. A transmission comprising a rotatable input shaft having a first toothed member and further comprising a rotatable output shaft having a second toothed member, and an electromagnetic clutch selectively operable to couple said first toothed member to said second toothed member and thereby couple said output shaft for rotation in unison with said input shaft, said clutch comprising a rotor associated with said input shaft, an armature associated with said output shaft and normally disposed in axially spaced opposing relation with said rotor, a rotationally stationary field having a coil which is operable when energized to produce magnetic flux for attracting said armature axially toward said rotor, means mounting said rotor to rotate with and to slide axially relative to said input shaft, spring means biasing said rotor axially relative to said input shaft and toward said armature, and a third toothed member rotatable with said armature and disposed in meshing engagement with said second toothed member, energization of said coil attracting said armature axially into frictional engagement with said rotor to cause said armature, said third toothed member, said second toothed member and said output shaft to rotate at substantially the same speed as said input shaft, continued energization of said coil causing said rotor, said armature and said third toothed member to shift axially against the bias of said spring means and thereby bring said third toothed member into engagement with said first toothed member while maintaining said third toothed member in meshing engagement with said second toothed member.

12. A transmission as defined in claim 11 further including a lost motion connection between said armature and said third toothed member and permitting said third toothed member to rotate through a limited range relative to said armature.

13. A transmission comprising a rotatable input shaft having a first toothed member and further comprising a rotatable output shaft having a second toothed member, a third toothed member normally disposed in meshing engagement with said second toothed member and normally disposed out of meshing engagement with said first toothed member, and an electromagnetic clutch for first causing said third toothed member to rotate at substantially the same speed as said first toothed member and for thereafter causing said third toothed member to shift axially into meshing engagement with said first toothed member while remaining in meshing engagement with said second toothed member, said clutch comprising a rotor rotatable with and slidable axially along said input shaft, an armature rotatable with said third toothed member and disposed in opposing relation with said rotor, means biasing said rotor axially along said input shaft and toward said armature, means for normally holding said rotor and said armature in axially spaced relation, and coil means which are operable when energized to produce magnetic flux for (a) attracting said armature axially into frictional engagement with said rotor to cause said armature, said third toothed member, said second toothed member and said output shaft to rotate at substantially the same speed as said input shaft, and for (b) thereafter causing said rotor, said armature and said third toothed member to shift axially against the opposition of said biasing means and thereby bring said third toothed member into engagement with said first toothed member while maintaining said third toothed member in meshing engagement with said second toothed member.

* * * * *